UNITED STATES PATENT OFFICE.

JULES DUVAL, OF NEW ORLEANS, LOUISIANA, ASSIGNOR TO HIMSELF, RICHARD T. SPRAGUE, OF BOSTON, MASSACHUSETTS, AND CHARLES D. SPRAGUE, OF NEW YORK CITY.

IMPROVED PROCESS OF SEPARATING FIBERS FROM COTTON-SEED.

Specification forming part of Letters Patent No. 105,923, dated August 2, 1870.

*To all whom it may concern:*

Be it known that I, JULES DUVAL, of New Orleans, in the parish of Orleans and State of Louisiana, have invented a new and Improved Process of Separating Fibers from Crushed Cotton-Seed; and I do hereby declare that the following is a full, clear, and exact description thereof, which will enable others skilled in the art to make and use the same.

My invention relates to and consists in a process for separating the fiber of cotton-seed from the hull, and thus utilizing (for paper-stock, pasteboard, or wadding) a substance which has been hitherto of little or no value to the public.

I first decompose the hull by chemical means, and then precipitate it in water. The fiber is thus separated and floats, while the disintegrated shell is thrown to the bottom.

The means which I preferably employ to carry out my process are as follows: I employ a tub of sufficient strength to bear a pressure of thirty to seventy-five pounds to the square inch, and provided with a perforated false bottom, or I use two tubs, one with and another without a perforated bottom. This tub is filled with water and with the cotton-waste from the oil-presses, so that the latter is well covered. The water is then heated, by steam or otherwise, to 100° or 120° Fahrenheit, at which temperature it is maintained for six or eight hours. During this time the hull becomes thoroughly soaked and softened. This liquid is now discharged by a suitable faucet or other outlet near the bottom of the tub, and an alkaline solution injected upon the softened substance until it is covered with the lye. The latter is then heated to the boiling-point, and maintained at or about this temperature. After steadily boiling for a period of about five or six hours the coloring-matter is, to a great extent, eliminated, and the consistency of the incrustaceous material destroyed. The alkaline liquid is now drawn off, and the cotton-seed waste is thoroughly washed until the water passing therethrough courses out uncolored.

A weak solution of sulphurous or other equivalent acid is then poured into the tub to remove all traces of the alkali. In this solution it remains from fifteen minutes to one hour, when the liquid is discharged.

The material is next soaked for about two hours in a solution of hypochloride of lime of about the strength of 2° or 3° Baumé, during which time the tub should be made gas-tight.

There remains at this stage of my process but little more around the fiber than a weak pellicle, whose adhesiveness has been in a great measure destroyed by the previous operations.

The material is again subjected to the action of a weak solution of caustic alkali, then washed in fresh water, and immediately afterward immersed for about two or three hours in a boiling solution of caustic alkali of the strength of 3° to 6° Baumé. At this point the pellicle entirely disappears, and the fiber itself assumes a dark yellow color.

The fiber is now submitted to a two or three hours' bath of sulphurous or other equivalent acid of about the strength of 2° or 3° Baumé, which is then drawn off, and subsequently removed to the oval trough commonly employed in paper-mills, where it is washed in hypochloride of lime of about the strength of 3° Baumé.

At this stage of my process the fiber is entirely separated from the shell, is deprived of color, and floats in the liquid. It is now ready to be washed clean in bicarbonate of soda, to eliminate the chloride, when the liquor is strained off and the fiber dried.

Having thus described all that is necessary to a clear understanding of my invention, what I claim as new, and desire to secure by Letters Patent, is—

The process above described of separating the fiber from crushed cotton-seed, applied as and for the purpose described.

JULES DUVAL.

Witnesses:
CHAS. D. SPRAGUE,
GEO. W. MABEE.